United States Patent [19]

Fisher

[11] Patent Number: 5,242,306
[45] Date of Patent: Sep. 7, 1993

US005242306A

[54] VIDEO GRAPHIC SYSTEM AND PROCESS FOR WIDE FIELD COLOR DISPLAY

[75] Inventor: Ralph W. Fisher, Park City, Utah

[73] Assignee: Evans & Sutherland Computer Corp., Salt Lake City, Utah

[21] Appl. No.: 833,970

[22] Filed: Feb. 11, 1992

[51] Int. Cl.⁵ .................. G09B 9/08; G09B 19/16
[52] U.S. Cl. ........................ 434/44; 434/43; 434/307; 358/60; 358/64; 352/69; 352/85; 353/30; 273/358
[58] Field of Search ............... 434/38, 43, 44, 68, 434/307, 308, 365, 20, 27, 29; 358/60, 64, 76, 87, 104, 231, 487; 273/358; 352/69, 70, 85; 340/701, 703, 728, 734; 353/30, 31

[56] References Cited

U.S. PATENT DOCUMENTS

| | | |
|---|---|---|
| 2,688,048 | 8/1954 | Rose .................................. 358/60 X |
| 3,485,944 | 12/1969 | Stephens, Jr. ...................... 358/60 |
| 4,634,384 | 1/1987 | Neves et al. |
| 4,656,506 | 4/1987 | Ritchey ............................. 358/60 X |
| 4,760,388 | 7/1988 | Tatsumi et al. .................... 434/69 X |
| 4,833,528 | 5/1989 | Kobayashi ........................ 358/60 X |
| 5,022,750 | 6/1991 | Flasck .................................. 353/30 |
| 5,103,306 | 4/1992 | Weiman et al. .................... 358/133 |

*Primary Examiner*—Richard J. Apley
*Assistant Examiner*—Joe Cheng

[57] ABSTRACT

A graphics system provides color image displays including a low resolution, wide field background and a contained high resolution area of interest, by projecting three component color images at wide angle, one of which (green) is blanked at the area of interest and is filled by a separate projection of a high resolution image (green). Simulator apparatus utilizing the graphics system responsively actuates a vehicle platform supplying data signals to an image generator apparatus whereby the area of interest may be variously displaced responsive to movements by of the viewing platform.

15 Claims, 2 Drawing Sheets

VIDEO GRAPHIC SYSTEM AND PROCESS FOR WIDE FIELD COLOR DISPLAY

BACKGROUND AND SUMMARY OF THE INVENTION

The present invention relates to video graphics for computer-generated displays and specifically is disclosed in relation to displays for training simulators as well as entertainment with wide fields of view.

Over the past few decades, a quest has continued for realistic computer graphics presentations. One objective has been to provide realistic computer-generated images for simulation systems. That is, the need has existed for images of sufficient realism that an observer perceives the displays as real objects rather than representations of simulation data from a computer memory. In addition to realism, simulation display systems must be capable of providing dynamic or moving images. For example, a flight simulator depicts views as observed from the cockpit of a moving airplane.

One technique for providing simulator displays involves a relatively large viewing screen encompassing the viewer. That is, a color video display is developed on a spherical viewing screen mounted to dominate the view from a platform carrying a simulated aircraft cockpit. Traditionally, such displays have been formed by combining separate, but spatially identical, red, green, and blue image components. Accordingly, by controlling the relative intensities of the three colors, a full color spectrum is perceived in the combined or composite image.

In the past, to develop wide field of view simulator displays, three separate video projectors have been employed to provide the three color images that are combined on a spherical viewing screen. For realism, the display must be characterized by a wide field of view and high resolution. However, inherently, video-generated wide fields of view have low resolution. As a result, it has been previously proposed to inset a high resolution image in the wide field at the area of interest. Specifically, a section of the background wide field image is removed or blanked from an inset area coinciding to the area of interest. That area is then replaced with a small field of view, high resolution image provided by another projection system. Traditionally, the inset image has required three projection sources (one for each color component) for a full color image. Consequently, considerable cost and technical difficulty is involved in providing and synchronizing the numerous, (e.g. six) projection sources for effective and convenient operation within the confines of a simulator.

In general, the present invention comprises a simplified and economical system to achieve a full color, detailed at the area of display interest. The present invention is based on recognizing the inability of the human eye to distinguish color at high spatial frequencies (small detail). Essentially, only one color, e.g. green, is blanked from the wide view display at the area of interest. A high resolution inset of the single deleted color then is projected in the inset area. Note that the human eye is most sensitive to the color green with the consequence of favoring the modification in that color. Essentially, the relatively large, wide fields of view, image components, e.g. red, blue and green, are projected as the background. A wide field background image in the third color, e.g. green, also is projected; however, with the inset area blanked. Thus, three projectors may be employed for the wide field background. A fourth projector provides the single detailed color (green) of the inset.

In demonstrations of the system involving a variety of images, observers were unable to perceive differences between the inset area and the background until resolution differences approached a ratio of ten to one. Below such a ratio, no abnormalities were reported as noticeable. Accordingly, the invention affords a considerably simplified system with resulting convenience and economy.

BRIEF DESCRIPTION OF THE DRAWINGS

In the drawings, which constitute a part of the specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, projectors, video apparatus, projection screen surfaces, image and simulator systems utilized in the combination of the present invention may be embodied in a wide variety of individual forms, some of which may be quite different from those of the disclosed embodiment. Consequently, the specific structural and functional details disclosed herein are merely representative; and yet in that regard, they are deemed to afford the best embodiment for purposes of disclosure and to provide a basis for the claims herein which define the scope of the present invention.

Figure 1:
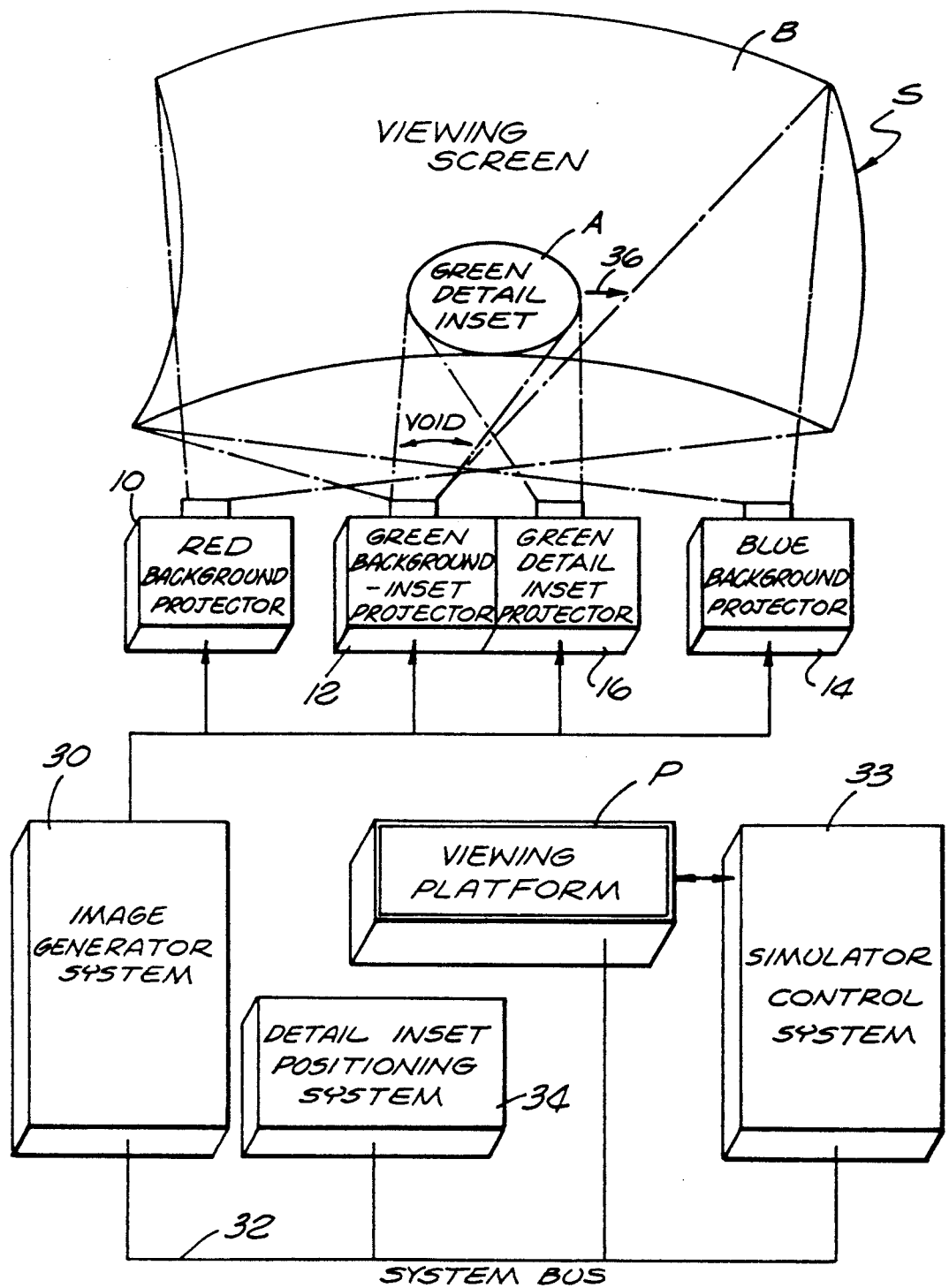
FIG. 1 is a combined block and perspective diagram of a system constructed in accordance with the present invention.

Referring initially to FIG. 1, a simulator system is represented as might be employed to train airplane pilots as well as the operators of various other crafts and vehicles. As dominantly indicated in FIG. 1, viewers would be located on a viewing platform P (central) to observe a viewing screen S (top). In that regard, detailed structures and arrangements for various simulators are well known in the prior art whereby a viewing platform incorporates a simulated vehicle from which an operator exercises control and views a display screen. Accordingly, the viewing platform P and the viewing screen S might well be constructed in accordance with or incorporated in any of a variety of such simulators.

Generally, from the viewing platform P, a person would perceive a feeling of being immersed in the environment depicted by a dynamic display on the screen S. In the instance of an aircraft simulator, the viewing platform P would incorporate a simulated cockpit including an enclosure with windows filled by images as depicted on the screen S.

The presentation on the screen S includes an inset or area A of interest enveloped by a wide field background B. Note that the area of the background B substantially fills the viewing screen S with low resolution images in full color. The area A of interest also is in full color; however, unexpectedly, a singular high resolution green component in the area A imparts a high resolution appearance to the area. Accordingly, while three projectors provide the background B component colors, within the area A of interest, one color, e.g. green carries a high resolution image to result in a good quality, desirable display.

At this point, it is noteworthy that the inset area A either may remain stationary or may move to accommodate simulator movements by coordination with the viewing platform P. Control systems for accomplishing such displacement of the area A are well known in the prior art.

Considering the projection apparatus in somewhat greater detail, the component color, wide angle images are projected for the background B in red, green and blue. Specifically, the background projectors 10, 12 and 14 respectively project component backgrounds in the colors red, green, and blue. However, as indicated above, the green component projector 12 projects an image that is blanked at the area A of interest. A detailed or high resolution green image then is provided from an insert projector 16 to detail the insert area A.

As symbolically illustrated, the projectors 12 and 16 may be closely associated to synchronize and coordinate the deletion of the background green component from the area A and inset the high resolution image. In that regard, numerous techniques are well known in the video arts for insetting or inserting one image within another and causing the inset image to rove. Essentially, the techniques may simply utilize image switching with respect to raster scanning operations.

Figure 2:
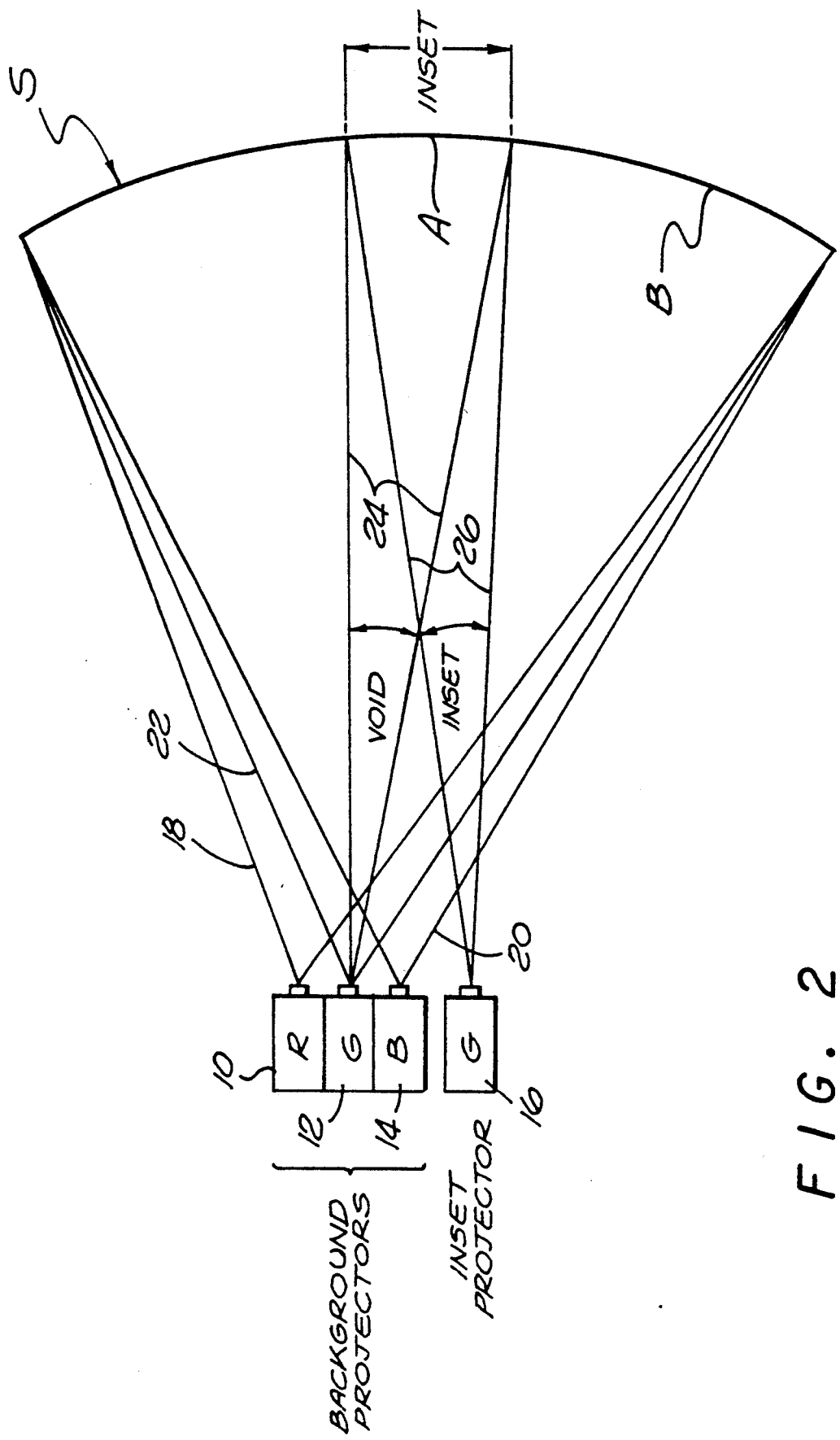
FIG. 2 is a diagrammatic representation of the projection patterns employed in the system of FIG. 1.

To consider the projections in somewhat greater detail, reference will now be made somewhat concurrently to FIGS. 1 and 2. In that regard, while the projections are represented somewhat dimensionally in FIG. 1, the illustration of FIG. 2 shows a vertical sectional view through the area A of interest. Note that for the convenience of illustration, the projectors are depicted in different arrangements in the two figures.

As indicated above, the red projector 10 provides a red low resolution, wide field background component substantially filling the viewing screen S. In FIG. 2, the projection pattern of the red component from the projector 10 is illustrated by a red projection cone 18.

The blue projector 14 functions in a similar manner providing a low resolution, full, wide field blue component background substantially filling the viewing screen S. In FIG. 2, the radiation pattern of the blue projector 14 is represented by a projection cone 20.

The green projector 12 also projects a low resolution, wide field color component for an image display that also fully occupies the screen S, except for the area A of interest. Accordingly, the projection pattern from the green projector 12 is represented in FIG. 2 by a projection cone 22 with a conical void 24 impacting the area A. Thus, the screen S is substantially filled by the three background color components red, blue, and green, except that the area A of interest receives only background projections of the component images blue and red. Perhaps it is noteworthy that the background projections alone produce a full color image display on the screen S except that at the area A of interest the image appears in a weak detailed, purplish-red color. Of course, specific colors will depend on relative intensities and component content.

The green detail projector 16 fills the area A of interest providing a smaller projection cone 24 (FIG. 2). That is, the green projector 16 projects a narrower high resolution, green color component to just fill the area A of interest. Surprisingly, the detailed or high resolution green projection imparts a highly detailed appearance to the image in the area A of interest. Furthermore, the area A illustrates good color balance and uniformity. Consequently, an observer viewing the entire image with attention somewhat concentrated on the area A of interest, will receive the impression of a highly detailed, full color, panoramic or wide angle view.

Use of the system as described above is well suited to simulators for providing a dynamic image, showing the views that would be seen from the cockpit of a moving airplane. For example, as described above, the system may utilize video images displayed thirty times per second. Accordingly, in the disclosed embodiment, the video projectors 10, 12, 14, and 16 are driven by an image generator system 30 (left, FIG. 1). Such systems are well known, some of which are described in the book, FUNDAMENTALS OF INTERACTIVE COMPUTER GRAPHICS, by J. D. Foley and A. Van Dam, published 1982 by Addison-Wesley Publishing Company, specifically see Chapter 10, "Advanced Display Architecture".

As illustrated in FIG. 1, the image generator 30 is connected to each of the projectors 10, 12, 14 and 16 and also to a system bus 32. Connections from the bus 32 extend to the viewing platform P as well as to a simulator control system 33 and a detail insert positioning system 34. The simulator control system 33 is also connected directly to the viewing platform P functioning to control the movement of the platform and monitor its position. Detailed forms of such apparatus are well known in the simulator art.

The detail image insert positioning system 34 is utilized for variously positioning or displacing the area of interest A with respect to the background B as projected on the screen S. Essentially, the positioning system 34 functions in cooperation with the image generator system 30 to provide the inset at the area A of interest somewhat as a window in the background B. Of course, a variety of video or television techniques may be employed based on a raster synchronization to blank the projection at the void cone 24 (FIG. 2) in the green projection cone 22 and substitute the detailed green inset as indicated by the cone 26. The positioning system 34 may utilize synchronizing ramps of the raster pattern as a basis for displacing the area A of interest utilizing techniques well known in the prior art as indicated above. Alternatively, any of a variety of blanking and filling techniques may be employed to accomplish the substitution.

Considering the operation of a simulator utilizing the system of the present invention as depicted in FIG. 1, the viewing platform P may incorporate an enclosure simulating the interior of an aircraft cockpit including controls and windows. Additionally, as well known in the art, the platform P incorporates actuators for variously moving the platform P in response to controls and a specific program. Specifically, the simulator control system 33 monitors the position of the viewing platform P and receives signals indicative of control actions by the operator. The representative signals are treated in accordance with the programmed operation of the system 33 to provide actuator signals for responsively moving the platform P.

Monitor signals from the viewing platform P and the simulator control system 33 are provided through the system bus 32 to the detail insert positioning system 34 and the image generator system 30. These systems function in cooperation to provide a programmed and responsive dynamic image on the screen S. Accordingly, an operator seated at the viewing platform P is provided not only the responsive physical displacement of the simulated flight, but also an attendant dynamic view.

Considering an example, if the operator actuates the controls (not shown) to revolve the cockpit to the right, so that the actual area A of interest is shifted to the right as indicated by an arrow 36 (FIG. 1).

With the displacement of the simulated cockpit on the viewing platform P, the insert positioning system 34 and the image generator 30 cooperate to shift the inset to the actual area A of interest as indicated.

As indicated above, systems for displacing a high resolution area of interest projection are well known in the prior art. However in the past, such systems have involved displacing three areas of interest, i.e. one for each of the color components. Accordingly, the system of the present invention has a considerable advantage in simplifying the apparatus and operation while continuing to provide an effective wide view image.

In addition to simplified operation and economy, the system of the present invention involves simplified programming operations for further economy and convenience. It will be apparent that the system of the present invention may be effectively used in simulation systems as well as various other apparatus involving the display of a color image.

Although the disclosed embodiment is directed to a specific format and embodiment, it will be apparent that the system may be variously embodied to accommodate any of a variety of individual structures, programs, displays, and operating formats. Furthermore, it will be apparent that while the disclosed embodiment comprises specific elements and configurations, any of a variety of structures might be utilized. Accordingly, the scope hereof is deemed to be as set forth in the following claims.

What is claimed is:

1. A graphics system for providing color image displays including a low resolution, wide field background and a contained high resolution, area of interest, said system comprising:
   means for providing at least one low resolution, full, wide field, color component for an image display;
   means for providing an other low resolution, wide field color component for said image display defining a void in said area of interest;
   means for providing a high resolution, color component coinciding in color to said other color component and filling said area of interest in said image display; and
   means for combining said at least one low resolution color component, said other low resolution color component and said high resolution color component to provide said image display.

2. A graphics system according to claim 1 wherein said high resolution color component comprises a green color component.

3. A graphics system according to claim 1 wherein said means for providing said at least one low resolution, full, wide field, color component, said means for providing said other low resolution, wide field color component and said means for providing said high resolution, color component comprise projection means.

4. A graphics system according to claim 3 wherein said means for combining comprises a display screen.

5. A graphics system according to claim 4 wherein said display screen defines a spherical display surface.

6. A system according to claim 1 further comprising video means to actuate said means for providing said at least one low resolution, full, wide field, color component, said means for providing said other low resolution, wide field color component and said means for providing said high resolution, color component in sequence for a dynamic display.

7. A system according to claim 6 wherein said high resolution color component comprises a green color component.

8. A system according to claim 7 wherein said means for providing said at least one low resolution, full, wide field, color component, said means for providing said other low resolution, wide field color component and said means for providing said high resolution projection means.

9. A graphics system according to claim 1 further including means for variously positioning said area of interest as contained in said image display.

10. A graphics system according to claim 9 further including a viewing platform means to which said means for variously positioning is slaved.

11. A process for providing color image displays including a low resolution, wide field background and a contained high resolution, area of interest, said process comprising the steps of:
    providing at least one low resolution, full, wide field color component for an image display;
    providing another low resolution, wide field color component for said image display to define a void in said area of interest;
    providing a high resolution, color component coinciding in color to said another color component and filling said area of interest in said image display; and
    combining said at least one low resolution color component, said another low resolution color component and said high resolution color component color components to provide said image display.

12. A process according to claim 11 wherein said high resolution color component comprises a green color component.

13. A process according to claim 11 wherein said step of providing said at least one low resolution, full, wide field, color component, said step of providing said another low resolution, wide field color component and said step of providing said high resolution, color component comprise projection means.

14. A process according to claim 13 further including a step of activating said projecting means in sequence for a dynamic display.

15. A process according to claim 11 further including a step of variously positioning said area of interest as contained in said image display.

* * * * *